United States Patent [19]

Mangiavacchi et al.

[11] 3,805,551

[45] Apr. 23, 1974

[54] QUICK MOUNTING AXIAL RETAINING ASSEMBLY FOR CONSTANT VELOCITY UNIVERSAL JOINTS

[75] Inventors: Jacques Mangiavacchi, Chatou; Francois Lukasiewicz, Vernouillet, both of France

[73] Assignee: Societe Anonyme: Glaenzer Spicer, Poissy, France

[22] Filed: Jan. 18, 1973

[21] Appl. No.: 324,891

[30] Foreign Application Priority Data
May 5, 1972 France .......................... 72.16141

[52] U.S. Cl. .................................. 64/21, 64/8
[51] Int. Cl. ................................... F16d 3/30
[58] Field of Search ....................... 64/21, 8, 7

[56] References Cited
UNITED STATES PATENTS
3,757,534  9/1973  Orain ....................... 64/8
3,151,473  10/1964  Cull ........................ 64/8
3,125,870  3/1964  Orain ....................... 64/7
2,182,455  12/1939  Smith ...................... 64/7

FOREIGN PATENTS OR APPLICATIONS
1,272,530  3/1962  France ................... 64/21

*Primary Examiner*—Samuel Scott
*Assistant Examiner*—Randall Heald
*Attorney, Agent, or Firm*—Baldwin, Wight & Brown

[57] ABSTRACT

A quick mounting axial retaining assembly for constant velocity universal joints comprising a forked member secured to one shaft, a cup-shaped member secured to the other shaft, a cross-piece fixed to the cup-shaped member and having three spindles and a central hub in which a mushroom-shaped member is force-fittingly received. A frangible stem is connected to and integrally formed with the outer spherical surface of the head portion of the mushroom-shaped member, the other end of the stem is secured to a star-shaped member having flexible arms adapted to be received in slots in the prongs of the formed member to join the two main parts of the joint by relative axial displacement towards one another. An elastic member is held under compression between the star-shaped member and a concave spherical cap in which the head portion is received for sliding movement. Once the joint is assembled, an angular displacement of the forked member relative to the cup-shaped member causes the frangible stem to rupture thereby releasing the elastic member to function normally in the joint.

6 Claims, 2 Drawing Figures

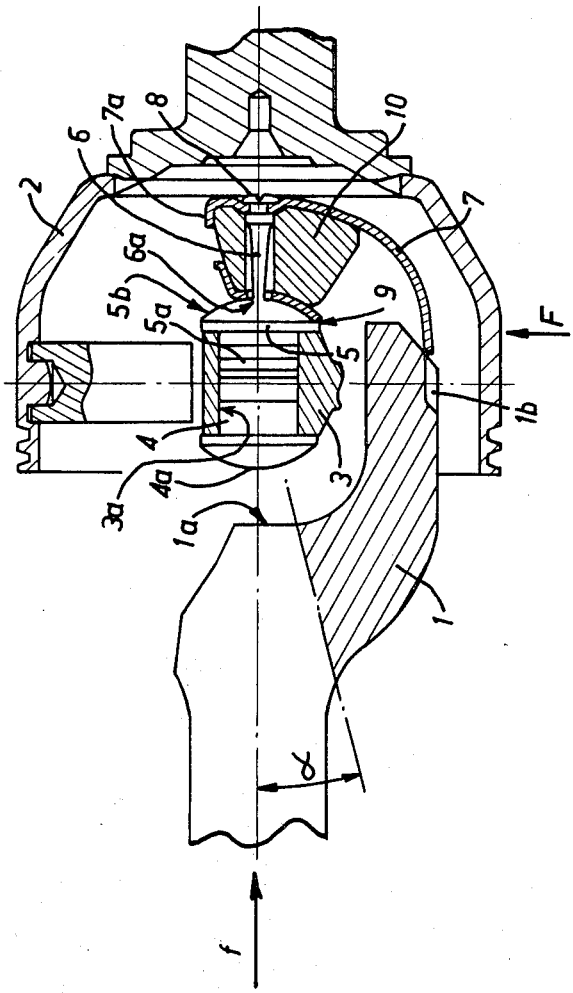
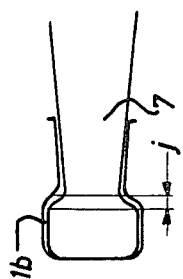

QUICK MOUNTING AXIAL RETAINING ASSEMBLY FOR CONSTANT VELOCITY UNIVERSAL JOINTS

The present invention concerns a quick mounting axial retaining assembly for coupling transmission shafts by means of a constant velocity universal joint having three spindles called a "tripod" constant velocity universal joint.

It has been found that the manner of mounting used until now for joining the two principal parts of such joints, i.e., the forked member and the surrounding cup-shaped member does not allow the clicking into place of the arms of a star-shaped coupling member onto the forked member by relative movement in one direction, but requires a wiggling or manoeuvring of the forked member to find in succession the securing points.

Further, certain difficulties may appear if the distance between the closed inner end of the cup-shaped member and the axis of the tripod joint is too great.

An aim of the invention is to overcome these drawbacks, and to this end consists in an axial retaining assembly for the quick mounting of the above-mentioned parts or members with a single force exerted along the axis of the aligned transmission shafts and corresponding parts or members.

The axial retaining assembly according to the invention comprises in a constant velocity universal joint with a forked member, a cup-shaped member, a cross piece with three spindles, a star-shaped member with three resilient arms for assembling the forked member to the cup-shaped member, a mushroom-shaped member force fitted in the knoblike portion of said cross piece and having head portion with a spherical outer surface on which a spherical cap having depending sides retaining a member of elastic material is received at its other side in a recess formed by a side depending from the star-shaped member, a frangible stem connected to the mushroom-shaped member extending through an opening in the elastic member, said stem having a smaller cross section at the point of attachment with the head portion of the mushroom-shaped member and the other or free end of the stem having means for fixing it with the star-shaped member after compressing the elastic member sufficiently to avoid any difficulty in securing the arms of the star-shaped to the forked member, the stem may be broken, after the securing of the arms, at the point of reduced cross-section in the vicinity of the point of attachment by a single angular displacement of the forked member which produces an angular force which exceeds the mechanical strength of the stem portion, the elastic member may then carry out its normal intended function.

The stem may be integrally formed with the head portion of the mushroom-shaped member which must be formed of a material which permits the rupture of snapping of the stem at the point it joins with the head portion without damaging the joint.

The material used for the joint is chosen to respond to the loading conditions of the centering assembly.

The invention will now be described in detail with reference to the accompanying drawings in which:

FIG. 1 shows a sectional view of the component parts of the joint before it is assembled; and FIG. 2 is a detail on a larger scale showing the end of one of the arms of the star-shaped member.

The joint considered herein is of the conventional "tripod" type comprising a forked member 1 and a cup-shaped member 2 in which a cross-piece 3 provided with three spindles forming the tripod per se is fixed.

The knoblike central portion on the cross piece 3 has an axial bore 3a which freely or force-fittingly receives a stud 4 having a head 4a with an outer spherical surface which is adapted to come into contact with the closed inner end of the forked member 1.

An important feature consists in that the bore 3a receives the mushroom stalk portion 5a of generally cylindrical configuration. The cylindrical stalk portion 5a has a profile which will ensure a good holding after it is received in the bore 3a in response to the conditions present during the assembling.

The spherical outer surface 5b of head portion of the mushroom-shaped member 5 is joined at one end of a frangible stem 6 which is fixed at its other end to the star-shaped member 7 for securing the forked member 1 to the cup-shaped member 2 in the conventional manner. The securing of the star-shaped member 7 to the stem 6 may effected by any suitable means which in this case is a screw 8.

A cap 9 of concave spherical shape is threaded on the stem 6. The cap 9 is provided with depending sides for assuring its orientation relative to the elastic member 10 which is also threaded onto the stem 6.

The elastic member 10 must be sufficiently deformable to enable the preliminary positioning without causing the rupture of the frangible stem 6 whose section 6a at its connection with the mushroom head portion must resist the forces due to the compressed elastic member as well as the clicking of the star-shaped member 7 into place in the slots or recesses 1b in the prongs of the forked member.

The mushroom-shaped member 5 must therefore be formed of a material which permits the rupture caused after the joint is assembled at the portion 6a of reduced cross section without damaging the joint as a whole.

As for the elastic member it may be of a material chosen to respond to the loading conditions of the centering assembly.

The star-shaped memmber 7 must, of course, be provided at its center with an opening which permits it to be rapidly joined to the other free end of the frangible stem 6. A depending side 7a ensures the holding of the elastic member 10. Flexible lugs are provided in a sufficient member so as to permit the centering assembly to be maintained in position after the clicking onto the forked member 1.

The above elements are assembled as follows:

The introduction of the forked member 1 into the cup-shaped member 2 is effected in a single direction $f$ and the slots or recesses $1_b$ formed in the prongs of the forked member simultaneously receive the flexible arms of the star-shaped member 7 clicked into place therein, leaving a clearance $j$ (FIG. 2) when the spherical surfaces 4a and 1a are in contact with the closed inner wall of the forked member. The clearance $j$ enables the successful mounting in all cases owing to the excellent positioning of the star-shaped member obtained by the compression of the elastic member 10 beyond its normal sides which are held in this position by means of the stem 6 and fixed by the securing means 8.

The connecting stem 6 which fixes the star-shaped 7 member to the mushroom-shaped member 5 will be ruptured or broken as soon as the shaft is subjected to an angular displacement $\alpha$ and at this precise moment the elastic member 10 will take on its role in the operation of the joint by expanding an amount equal to the clearance $j$ effected during the assembling of the joint.

The invention is applicable to all constant velocity universal joints of the tripod type.

What we claim is:

1. A quick mounting axial retaining assembly for constant velocity universal joints of the type comprising a forked member with a plurality of angularly space-apart prongs, a cup-shaped member, a cross-piece being fixed to said cup-shaped member and having three spindles and a central hub, a star-shaped member with three resilient arms for effecting the joining of the forked member to the cup-shaped member, comprising: a mushroom-shaped member having a stalk portion force-fitted in the central hub portion of the cross-piece and a head portion with a spherical outer surface, a concave spherical cap complementary to the spherical outer surface and in sliding contact therewith, an elastic member disposed between said star-shaped member and said cap for maintaining said cap in intimate contact with said spherical outer surface, a frangible stem fixed to the head portion at one end and secured to the star-shaped member at its other end after compressing the elastic member, said stem having a portion of reduced cross-section near said one end, so that when the arms of the star-shaped member are secured to the prongs of the forked member, the stem is adapted to be ruptured by angular displacement of the forked member relative to the cup-shaped member which causes a force to be exerted on the portion of reduced section greater than the mechanical strength thereof, thereby freeing the elastic member for its normal operating function in the joint.

2. A retaining assembly as claimed in claim 1, wherein each of the prongs is provided with a slot in which free ends of the flexible arms of the star-shaped member are adapted to be received, such that when the free ends are initially received in their respective slots a clearance is present which is taken up when the stem is ruptured.

3. A retaining assembly according to claim 1, wherein said cap is provided with a depending side which extends towards the star-shaped member for retaining the elastic member, and wherein the star-shaped member has a recessed portion for receiving the elastic member and a depending side extending towards said cap also for retaining the elastic member.

4. A retaining assembly according to claim 1, wherein the stem is integrally formed with the mushroom-shaped member.

5. A retaining assembly according to claim 1, wherein the material of which the stem is formed is such that upon rupture it causes no damage to the joint.

6. A quick mounting axial retaining assembly for constant velocity universal joints of the type comprising a forked member with angularly spaced-apart prongs adapted to be mounted on a first transmission shaft, a cup-shaped member adapted to be mounted on a second transmission shaft, a cross piece fixed to the cup-shaped member, a star-shaped member for effectively joining the forked member and the cup-shaped member having flexible arms adapted to be secured in place in slots in the prongs by relative axial movement of said forked member and said cup-shaped member, a frangible stem for effectively joining the star-shaped member to the cross piece, an elastic member operatively arranged between the cross-piece and the star-shaped member and initially compressed by the stem, whereby upon rupture of the stem by relative angular displacement of the shafts, the elastic member is released to function normally in the joint.

* * * * *